(12) United States Patent
Lewites

(10) Patent No.: US 8,041,932 B2
(45) Date of Patent: *Oct. 18, 2011

(54) METHOD AND APPARATUS FOR ASSIGNING DEVICES TO A PARTITION

(75) Inventor: Saul Lewites, Renton, WA (US)

(73) Assignee: Intel Corporation, Santa Clara, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 12/221,483

(22) Filed: Aug. 4, 2008

(65) Prior Publication Data

US 2009/0049289 A1   Feb. 19, 2009

Related U.S. Application Data

(63) Continuation of application No. 11/294,839, filed on Dec. 5, 2005, now Pat. No. 7,418,586.

(51) Int. Cl.
*G06F 9/00* (2006.01)
*G06F 3/00* (2006.01)
*G06F 13/00* (2006.01)

(52) U.S. Cl. .................. 713/1; 713/2; 710/10; 710/104

(58) Field of Classification Search .................. 713/1, 2; 710/10, 104

See application file for complete search history.

(56) References Cited

U.S. PATENT DOCUMENTS

| | | |
|---|---|---|
| 6,457,069 B1 | 9/2002 | Stanley |
| 6,725,178 B2 | 4/2004 | Cheston et al. |
| 6,934,833 B2 | 8/2005 | Larvoire |
| 6,973,517 B1 | 12/2005 | Golden et al. |
| 6,985,990 B2 | 1/2006 | Bronson et al. |
| 6,996,706 B1 | 2/2006 | Madden et al. |
| 7,418,586 B2 | 8/2008 | Lewites |
| 7,716,465 B2 | 5/2010 | Lewites |
| 7,802,081 B2 | 9/2010 | Schultz et al. |
| 2002/0124040 A1 | 9/2002 | Foster et al. |
| 2002/0156824 A1 | 10/2002 | Armstrong et al. |
| 2003/0009654 A1 | 1/2003 | Nalawadi et al. |

(Continued)

FOREIGN PATENT DOCUMENTS

| | | |
|---|---|---|
| KR | 10-2001-0082040 A | 8/2001 |
| WO | 99/41672 A1 | 8/1999 |
| WO | 2007/067446 A1 | 6/2007 |

OTHER PUBLICATIONS

Intel I/O Controller Hub 6 (ICH6) Family, Datasheet, Jan. 2005.

(Continued)

*Primary Examiner* — Stefan Stoynov

(74) *Attorney, Agent, or Firm* — Schwabe, Williamson & Wyatt, P.C.

(57) ABSTRACT

Devices in a processing system may be managed by performing a first scan of a bus of the processing system from a first partition. In one embodiment, the first scan may discover location information for devices on the bus. A communications hub of the processing system may be programmed to hide at least one of the devices on the bus. After the communications hub is so programmed, the first partition may scan the bus again. A second partition of the processing system may receive location information for one or more of the devices detected in the first scan but not detected in the second scan. In one embodiment, the second partition may boot, and then the communications hub may again be programmed to hide at least one of the devices on the bus. An operating system may then boot on the first partition. Other embodiments are described and claimed.

22 Claims, 4 Drawing Sheets

U.S. PATENT DOCUMENTS

| | | |
|---|---|---|
| 2003/0115443 A1 | 6/2003 | Cepulis et al. |
| 2004/0068645 A1 | 4/2004 | Larvoire |
| 2005/0125580 A1 | 6/2005 | Madukkarumukumana et al. |
| 2005/0144434 A1 | 6/2005 | Taylor et al. |
| 2005/0289283 A1 | 12/2005 | Warrier et al. |

OTHER PUBLICATIONS

Bogowitz et al., "Reducing Costs with Intel® Active Management Technology", White Paper—Intel Information Technology, IT@Intel, Aug. 2005, 15 pages.

Intel Corporation, "Intel® 82573E/V/L Gigabit Ethernet Controllers", Product Brief—Network Connectivity, Intel® PRO, Network Connections, 2005, whole document.

Bogowitz et al., "Intel® Active Management Technology Reduces IT Costs with Improved PC Manageability", Technology@Intel Magazine, Sep. 2004, 7 pages.

International Search Report and Written Opinion for PCT Application No. PCT/US2007/009337, mailed on Sep. 19, 2007, 10 pages.

International Search Report and Written Opinion for PCT Application No. PCT/US2006/046123, mailed on Apr. 5, 2007, 12 pages.

International Preliminary Report on Patentability for PCT Application No. PCT/US2006/046123, mailed on Jun. 19, 2008, 7 pages.

METHOD AND APPARATUS FOR ASSIGNING DEVICES TO A PARTITION

CROSS REFERENCE TO RELATED APPLICATIONS

This application is a Continuation of U.S. patent application Ser. No. 11/294,839, entitled "Method and Apparatus for Assigning Devices to a Partition," by Saul Lewites, filed on Dec. 5, 2005 now U.S. Pat. No. 7,418,586.

FIELD OF THE INVENTION

The present disclosure relates generally to the field of data processing, and more particularly to methods and related apparatus for supporting multiple partitions in a processing system.

BACKGROUND

In a typical legacy data processing system, firmware provides the machine instructions that control the system when the system is being powered up or has been reset, but before an operating system (OS) is booted. That is, the firmware controls the pre-OS or pre-boot operations. Firmware may also control certain operations after the OS has been loaded, such as operations for handling certain hardware events and/or system interrupts. The firmware may handle pre-boot and post-boot operations through a set of routines referred to collectively as a basic input/output system (BIOS). The BIOS thus provides the interface between the hardware components of the system and software components such as the OS.

For purposes of this disclosure, the term "firmware" refers to software that may execute in a processing system before the processing system has booted to an OS, software that may provide runtime services that allow the OS or other components to interact with the processing system hardware, and similar types of software components. Traditionally, firmware has typically been stored in non-volatile memory. In more recent years, however, processing systems have been developed that store firmware in other types of storage devices or obtain firmware from remote repositories.

For purposes of this disclosure, depending upon the particular implementation under consideration, the term "processing unit" may denote an individual central processing unit (CPU) within a processing system, a processing core within a CPU, a logical processing unit such as a hyper-thread (HT), or any similar processing resource, or any collection of such resources configured to operate collectively as a unit. In a system where multiple processing units exist, the operating system (OS) normally owns all of the processing units.

Also, in some processing systems, it is possible to hide one or more of the processing units from the OS, for instance by modifying the advanced configuration and power interface (ACPI) tables produced by the BIOS. In some systems it is also possible to hide one or more portions of random access memory (RAM) from the OS. Additionally, in some systems, several peripheral and integrated devices can be hidden from the OS, for example by updating device-hide registers or other locations in the system's input/output (I/O) controller hub (ICH). These techniques may be used to hide devices for debugging purposes.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

In addition to conventional uses for debugging purposes, the techniques described above may also be used to create two (or more) execution environments within a single processing system. Such an execution environment may also be called a partition. For instance, a processing system may include a main partition and a sequestered partition. The main partition may include a general purpose OS (e.g., one of the various Windows®-based OSs, a Linux®-based OS, etc.) and one or more user applications (e.g., a web server, a business application, etc.). The sequestered partition may not be visible to the main OS, and the sequestered partition may be used for a wide variety of applications, including, without limitation, I/O offloading, platform manageability, and/or fault prediction.

Figure 1:
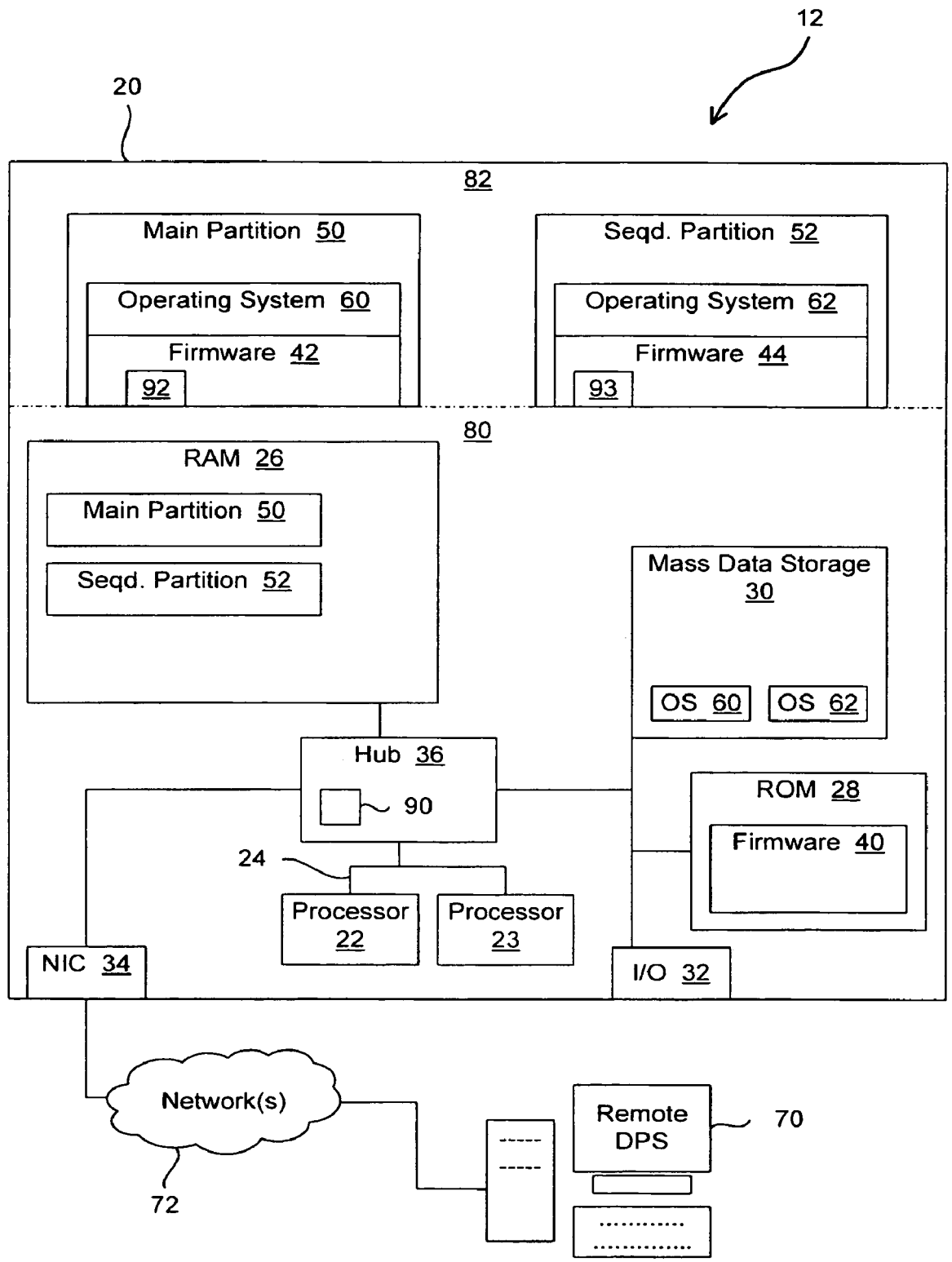
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, one or more processors or CPUs 22-23 communicatively coupled, directly or indirectly, to various other components via one or more system buses 24 or other communication pathways or mediums. In the example embodiment, CPU 22 serves as a bootstrap processor for processing system 20, and CPU 23 serves as an application processor. Alternative embodiment may utilize other kinds of processors. One or more of CPUs 22-23 may include one or more processing cores, and one or more of the processing cores may support two or more HTs or similar techniques for executing multiple threads simultaneously or substantially simultaneously.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Processing system 20 may also respond to directives or other types of information received from other processing systems or other input sources or signals. Processing system 20 may utilize one or more connections to one or more remote data processing systems 70, for example through a network interface controller (NIC)

34, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processors 22-23 may be communicatively coupled to one or more volatile or non-volatile data storage devices, such as RAM 26, read-only memory (ROM) 28, and one or more mass storage devices 30. The mass storage devices 30 may include, for instance, integrated drive electronics (IDE), small computer system interface (SCSI), serial advanced technology architecture (SATA) hard drives, and/or other devices or media, such as floppy disks, optical storage, tapes, flash memory, memory sticks, compact flash (CF) cards, digital video disks (DVDs), etc. For purposes of this disclosure, the term "ROM" may be used in general to refer to non-volatile memory devices such as erasable programmable ROM (EPROM), electrically erasable programmable ROM (EEPROM), flash ROM, flash memory, etc.

Processors 22-23 may also be communicatively coupled to additional components, such as video controllers, SCSI controllers, network controllers, universal serial bus (USB) controllers, I/O ports 32, input devices such as a keyboard, a mouse, a camera, etc. Processing system 20 may also include one or more bridges or hubs, such as a memory controller hub, an I/O controller hub 36, a peripheral component interconnect (PCI) root bridge, etc., for communicatively coupling system components. As used herein, the term "bus" includes pathways that may be shared by more than two devices, as well as point-to-point pathways.

Some components, such as NIC 34, for example, may be implemented as adapter cards with interfaces (e.g., a PCI connector) for communicating with a bus. Alternatively, NIC 34 and other devices may be implemented as onboard or embedded controllers, using components such as programmable or non-programmable logic devices or arrays, application-specific integrated circuits (ASICs), embedded computers, smart cards, and the like.

In the example embodiment, processing system uses firmware-based partitioning. Specifically, once processing system 20 has been started or powered on, firmware 40 may create a main partition 50 and a sequestered partition 52 within processing system 20. Main partition 50 includes the BIOS code (e.g., firmware 42) running on bootstrap processor (BSP) 22. Sequestered partition 52 includes the BIOS code (e.g., firmware 44) running on application processor 23. The main partition may also be referred to as a non-sequestered partition. In alternative embodiment, partitions may run on other types of processing units.

In the example embodiment, ICH 36 includes configuration constructs such as device hide registers 90 that allow various components or devices within processing system to be disabled or hidden from OS 60 in main partition 50. For instance, the configuration constructs may be used to cause the ICH to block configuration cycles for certain devices. Also, in the example embodiment, ACPI parameters 92, 93 may be used to hide one or more portions of RAM 26 from OS 60 and/or OS 62. Additional details about device hide registers and related topics may be obtained from the Intel® I/O Controller Hub 6 (ICH6) Family Datasheet, dated January 2004 (the "ICH6 datasheet"). In alternative embodiments, other data storage constructs within an ICH and/or within one or more other components may be used to disable or hide devices within a processing system, and other techniques may be used to hide some of the RAM.

The invention may be described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" is used in general to cover a broad range of software constructs, including applications, routines, methods, modules, drivers, subprograms, processes, and other types of software components.

For instance, ROM 28, data storage device 30, and/or RAM 26 may include various sets of instructions which, when executed, perform various operations. Such sets of instructions may be referred to in general as software.

In the example embodiment, processing system 20 uses techniques such as those described above to create two distinct partitions in processing system 20: main partition 50 and sequestered partition 52. In alternative embodiments, a processing system may have more than one main partition and/or more than one sequestered partition. As illustrated in FIG. 1, in the example embodiment, the programs or software components 82 may include a distinct instance of firmware 40 for each partition. Each partition may also receive its own OS and its own applications. For instance, in the example embodiment, each partition receives some or all of the firmware code 40 from ROM 28. In particular, processing system 20 loads one instance of firmware 40 (i.e., firmware 42) into main partition 50, and another instance (i.e., firmware 44) into sequestered partition 52. The OS 60 for main partition 50 may be the same as, or different from, the OS 62 for sequestered partition 52.

Figure 2:
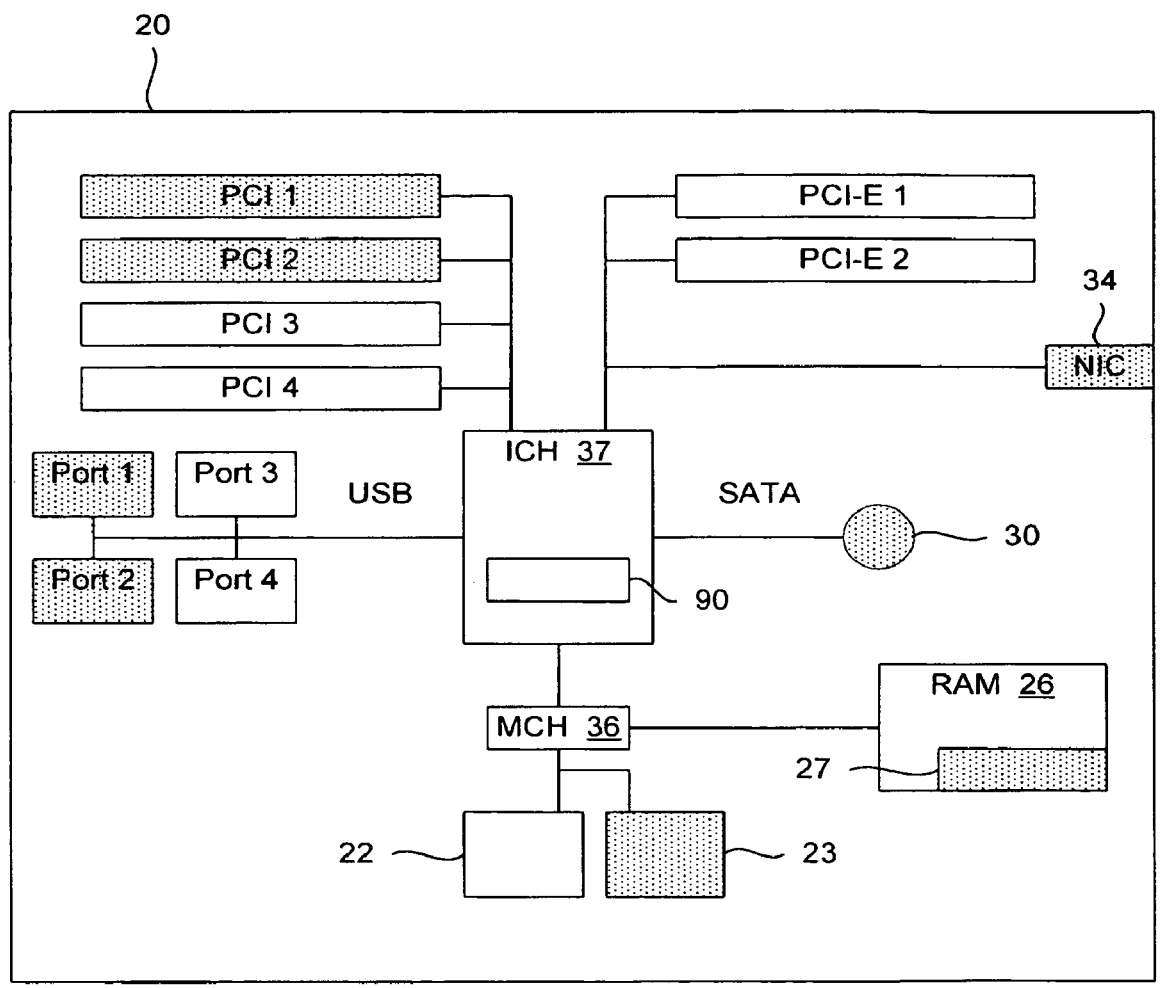
FIG. 2 is a block diagram providing additional details regarding some of the hardware components in the processing system of FIG. 1.

FIG. 2 is a block diagram providing additional details regarding some of the hardware components in the processing system of FIG. 1. FIG. 2 highlights the partitioning of the expansion slots and integrated devices in an example system. In particular, FIG. 2 uses dotted fill in the blocks for certain devices, to illustrate that those devices, or portions thereof, will be hidden from OS 60. For instance, in the example embodiment, the following components will be made available to sequestered partition 52 and hidden from OS 60:
 processor 23;
 mass storage device 30;
 NIC 34;
 USB ports 1 and 2; and
 PCI slots 1 and 2.
The following components may remain visible to, and available for use by, OS 60:
 processor 22;
 USB ports 3 and 4;
 PCI-Express (PCI-E) slots 1 and 2; and
 PCI slots 3 and 4.
Also, in the example embodiment, most of RAM 26 will remain visible to OS 60, but a portion 27 will be hidden from OS 60 and made available to sequestered partition 52.

In the example embodiment, the operations for sequestering devices are performed during the pre-boot portion of the initialization process that takes place when processing system 20 is turned on or reset. As described in greater detail below, in the example embodiment, firmware 42 in main partition 50 has primary control of the initialization operations of processing system 20. However, main partition 50 passes control to sequestered partition 52 when appropriate for purposes such as allowing firmware 44 to initialize sequestered partition 52, etc.

Figure 3:
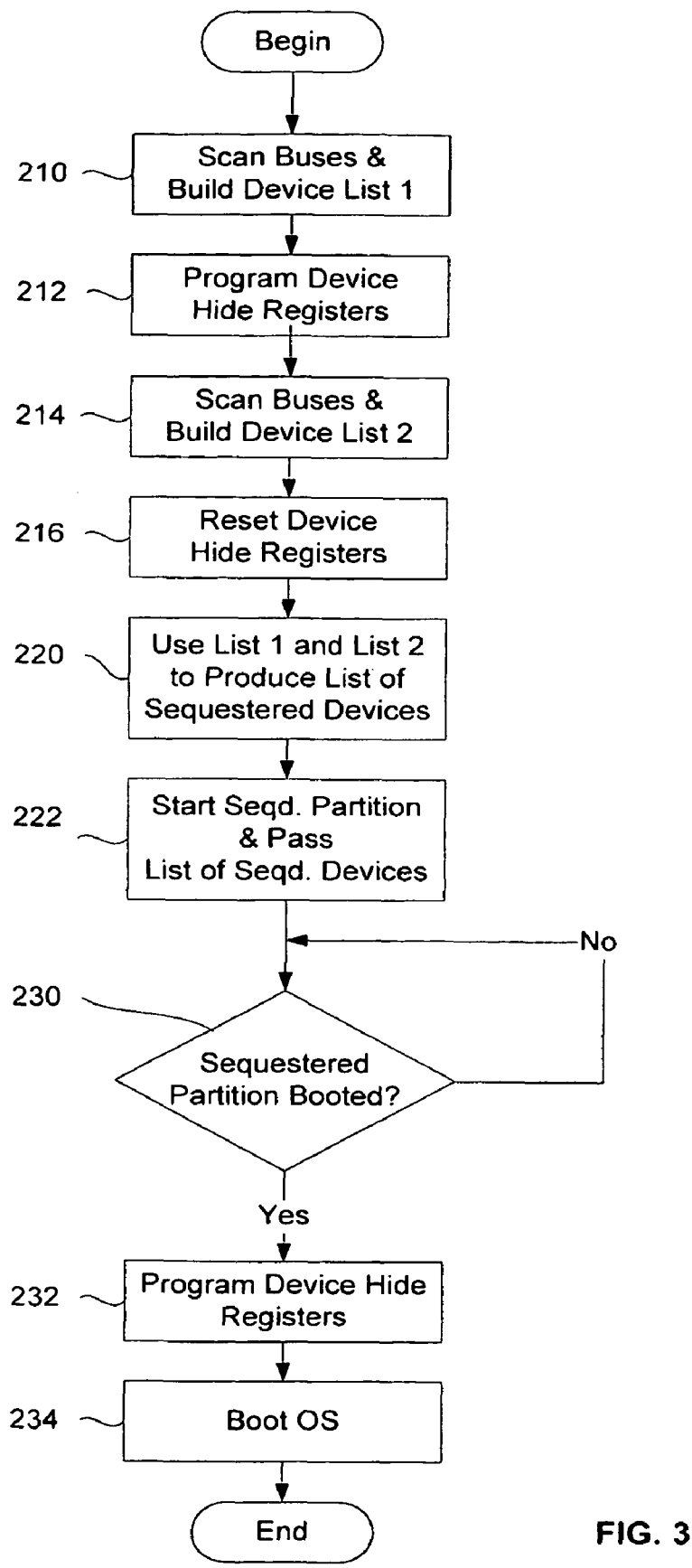
FIGS. 3 and 4 are flowcharts depicting various aspects of a process for assigning devices to a partition, according to an example embodiment of the present invention.
Figure 4:
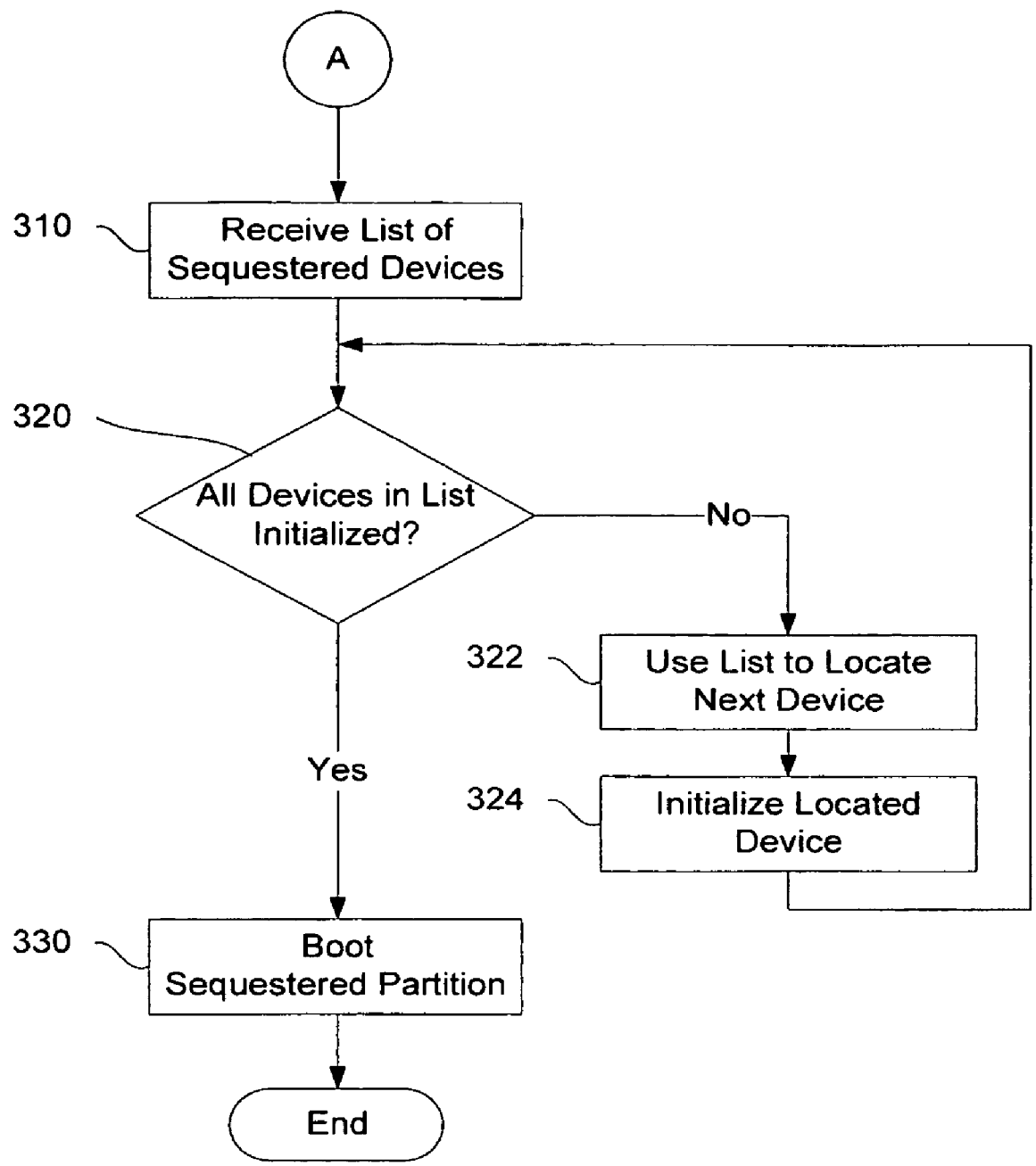

FIGS. 3 and 4 are flowcharts depicting various aspects of a process for assigning devices to a partition, according to an example embodiment of the present invention. In particular, FIG. 3 represents the perspective of main partition 50, while FIG. 4 represents the perspective of sequestered partition 52.

FIG. 3 begins with processing system 20 at or near the beginning of an initialization process. That process may have started in response to processing system 20 being powered on or reset, for instance. At block 210, firmware 42 in main partition 50 may scan all PCI buses in processing system 20, as well as any other buses, and may build a first device list identifying all of the devices discovered on those buses. For instance, in the example embodiment, processing system 20 may scan one or more PCI buses, PCI-E buses, USB buses, industry standard architecture (ISA) buses, etc. In alternative embodiments, other types of buses may be scanned. The process of scanning buses in a processing system to determine which devices are present may be referred to in general as a bus scan. A bus scan may include operations such as the programming of bridges and device base address registers (BARs).

When building the first device list, main partition 50 may include the location information for some or all of the devices discovered during the first scan. For example, the location information may include the bus number, the device number, the function number, and the device type for each discovered device. The device type or any other suitable flag or data item may be used to keep track of which devices are bridges. For bridges, the local information may also identify the type of bridge and may include other information associated with a bridge, such as subordinate bus.

As indicated at block 212, after the first device list has been built, main partition 50 may program device hide registers 90 and/or similar configuration constructs to hide certain predetermined devices. This programming may set or clear bits in the configuration constructs, based on a pre-selected device distribution. For instance, ROM 28 may have been pre-programmed by a user (e.g., a manufacturer, an administrator, an end user, etc.) with configuration information that specifies which devices are to be used by sequestered partition 52 and hidden from main partition 50. In alternative embodiments, the main partition may retrieve the configuration information from any other suitable data repository.

The configuration information may identify the devices to be hidden by specifying how device hide registers 90 and similar configuration constructs are to be configured. For instance, processing system 20 may assign the device number 0 to a device in the expansion slot labeled PCI 1 in FIG. 2, and if an administrator has configured processing system 20 to hide that device, the configuration information may include data indicating that bit 0 of a Secondary PCI Device Hiding (SPDH) register should be set to 1. The configuration information in ROM 28 may use similar approaches to identify other types of devices to be hidden, such as SATA controllers, an onboard NIC, devices on other types of buses, etc. For instance, the configuration information may include data indicating that main partition 50 is to use a function disable (FD) register to hide particular devices on PCI-E buses, USB buses, etc.

As indicated at block 214, main partition 50 may then perform a second bus scan, and may build a second device list to identify all of the devices detected during the second scan. Main partition 50 may then reset the configuration constructs to unhide or unblock any hidden devices, as indicated at block 216. Also, as shown at block 220, main partition 50 may compare the first and second device lists and produce a list of devices to be sequestered, to include the devices found in the first scan but not in the second scan. The list produced based on the comparison may be referred to as the list of sequestered devices, and that list may include the same type of location information as the first device list, for each device to be sequestered.

As shown at block 222, main partition 50 may then start sequestered partition 52, and may pass the list of devices to be sequestered to sequestered partition 52. Since no devices will be hidden, in accordance with block 216, sequestered partition 52 will be able to read the configuration space of the devices to be sequestered.

As indicated at block 230, after sending the sequestered device list to sequestered partition 52, main partition 50 may wait until sequestered partition 52 has booted. As shown at block 232, after sequestered partition 52 has booted, main partition 50 may again program configuration constructs such as device hide registers 90 to hide the sequestered devices from main partition 50. Main partition 50 may then boot OS 60, as indicated at block 234. The process of FIG. 3 may then end.

The process of FIG. 4 may start in response to the operations depicted at block 222 of FIG. 3, when main partition 50 starts sequestered partition 52. As indicated at block 310 of FIG. 4, once started, sequestered partition 52 may receive from main partition 50 the list of devices to be sequestered. Sequestered partition 52 may then initialize the devices on the list without performing a bus scan.

For instance, sequestered partition may determine whether all of the devices on the list have been initialized, as shown at block 320. If sequestered partition 52 has not yet initialized all of the devices on the list, sequestered partition select a next device to be initialized, and may use information in the list such as the bus number, the device number, the function number, and the device type for the selected device to locate that device, as shown at block 322. As indicated at block 324, sequestered partition may then initialize that device. When initializing a device, sequestered partition 52 may extract whatever information it requires from the configuration space of that device, and may perform any other operations necessary to configure the device, such as programming BARs of the device and possibly executing an option ROM of the device. However, in the example embodiment, sequestered partition 52 avoids reprogramming any bridges or BARs, since, depending on the bus topology, reconfiguring bridges or device BARs could render the bridges or devices inaccessible. Also, in the example embodiment, sequestered partition 52 does not initialize any devices that aren't assigned to it (i.e., that are not included in the list of sequestered devices).

Once all of the devices for sequestered partition 52 have been initialized, sequestered partition 52 may boot OS 62, as indicated at block 330, and sequestered partition 52 may use the sequestered devices. The process of FIG. 4 may then end.

As has been described, one partition in a processing system may discover locations of devices to be sequestered, and may pass a list with location information for those devices to a second partition. The second partition may then initialize those devices. Device hide registers and/or related configuration constructs may then be programmed to hide or block those devices for the first partition. In the example embodiment, the device hide registers are so programmed before the OS on the first partition boots. In various embodiments the device hide registers may be so programmed by the first partition or the second partition. In the example embodiment, the location of each sequestered device is provided to the sequestered partition, and the sequestered partition therefore need not perform a bus scan. The sequestered partition may therefore avoid the ambiguous results that could happen if the sequestered partition were to scan buses containing multiple instances o the same type of device (e.g., USB ports).

In addition, even though the main partition may set device hide registers and/or related settings after the sequestered partition has booted, the sequestered partition may continue to use the hidden devices since the ICH may block configuration cycles for the sequestered devices, but it may not block access to the I/O addresses and memory mapped registers of those devices.

Also, as indicated above, a processing system may contain more than one main partition, more than one sequestered partition, or multiple main partitions and sequestered partitions. Such processing systems may use variations of the process described above to implement sequestered devices for one or more sequestered partitions.

In light of the principles and example embodiments described and illustrated herein, it will be recognized that the described embodiments can be modified in arrangement and detail without departing from such principles. Also, although the foregoing discussion has focused on particular embodiments, other configurations are contemplated as well. Even though expressions such as "in one embodiment," "in another embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media encoding instructions for performing the operations of the invention. Such embodiments may also be referred to as program products. Such machine-accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A processing system comprising:
   a processor;
   a communications hub responsive to the processor;
   a bus responsive to the communications hub;
   a machine-accessible storage medium responsive to the processor; and
   instructions in the machine-accessible medium, wherein the instructions, when executed, result in operations comprising:
      performing a first scan of the bus, the first scan to discover location information for devices on the bus;
      programming the communications hub to hide at least one of the devices on the bus from a first partition in the processing system;
      performing a second scan of the bus after the communications hub has been programmed to hide at least one of the devices; and
      providing a second partition in the processing system with location information for one or more of the devices that the communications hub was programmed to hide.

2. A processing system according to claim 1, wherein the operations further comprise:
   using the location information to initialize, in the second partition, one or more of the devices that the communications hub was programmed to hide.

3. A processing system according to claim 1, wherein the operations further comprise:
   initializing devices in the second partition without scanning the bus from the second partition.

4. A processing system according to claim 1, wherein the operations further comprise:
   booting the second partition;
   again programming the communications hub to hide at least one of the devices on the bus after the second partition has booted; and
   booting an operating system on the first partition after the communications hub has been again programmed to hide at least one of the devices on the bus.

5. A processing system according to claim 1, wherein the operations further comprise:
   after programming the communications hub to hide at least one of the devices, programming the communications hub to reveal the previously hidden devices; and
   using the location information to initialize one or more devices in the second partition after programming the communications hub to reveal the previously hidden devices.

6. A processing system according to claim 5, wherein the operations further comprise:
   after initializing one or more devices in the second partition, again programming the communications hub to hide at least one of the devices on the bus.

7. A processing system according to claim 6, wherein the operations further comprise:
after initializing one or more devices in the second partition and then again programming the communications hub to hide at least one of the devices on the bus, booting an operating system on the first partition.

8. A processing system according to claim 1, wherein the operations further comprise:
building a first device list to include substantially all devices discovered in the first scan;
building a second device list to include substantially all devices discovered in the second scan; and
automatically comparing the first and second device lists to identify devices to be sequestered; and
wherein the operation of providing the second partition with location information comprises providing the second partition with location information for the devices to be sequestered.

9. A processing system according to claim 1, wherein the location information comprises at least one item from the group consisting of a bus number, a device number, and a function number.

10. A processing system according to claim 1, wherein the communications hub comprises an input/output controller hub (ICH).

11. A processing system according to claim 1, wherein the communications hub comprises device hide registers for causing devices on the bus to be hidden.

12. A processing system according to claim 1, wherein:
the first partition comprises a non-sequestered partition; and
the second partition comprises a sequestered partition.

13. An apparatus comprising:
a machine-accessible storage medium; and
instructions in the machine-accessible storage medium, the instructions to perform operations comprising:
performing a first scan of a bus in a processing system, the first scan to discover location information for devices on the bus;
programming a communications hub to hide at least one of the devices on the bus from a first partition in the processing system;
performing a second scan of the bus after the communications hub has been programmed to hide at least one of the devices; and
providing a second partition in the processing system with location information for one or more of the devices that the communications hub was programmed to hide.

14. An apparatus according to claim 13, wherein the operations further comprise:
using the location information to initialize, in the second partition, one or more of the devices that the communications hub was programmed to hide.

15. An apparatus according to claim 13, wherein the operations further comprise:
initializing devices in the second partition without scanning the bus from the second partition.

16. An apparatus according to claim 13, wherein the operations further comprise:
after programming the communications hub to hide at least one of the devices, programming the communications hub to reveal the previously hidden devices; and
using the location information to initialize one or more devices in the second partition after programming the communications hub to reveal the previously hidden devices.

17. An apparatus according to claim 16, wherein the operations further comprise:
after initializing one or more devices in the second partition, again programming the communications hub to hide at least one of the devices on the bus.

18. An apparatus according to claim 17, wherein the operations further comprise:
after initializing one or more devices in the second partition and then again programming the communications hub to hide at least one of the devices on the bus, booting an operating system on the first partition.

19. An apparatus according to claim 13, wherein the operations further comprise:
building a first device list to include substantially all devices discovered in the first scan;
building a second device list to include substantially all devices discovered in the second scan; and
automatically comparing the first and second device lists to identify devices to be sequestered; and
wherein the operation of providing the second partition with location information comprises providing the second partition with location information for the devices to be sequestered.

20. An apparatus according to claim 13, wherein the location information comprises at least one item from the group consisting of a bus number, a device number, and a function number.

21. An apparatus according to claim 13, wherein the communications hub comprises an input/output controller hub (ICH).

22. An apparatus according to claim 13, wherein:
the first partition comprises a non-sequestered partition; and
the second partition comprises a sequestered partition.

* * * * *